US011351645B2

(12) United States Patent
Donadini

(10) Patent No.: US 11,351,645 B2
(45) Date of Patent: Jun. 7, 2022

(54) METHOD AND INFRASTRUCTURE FOR THE DUPLICATION OF KEYS

(71) Applicant: SILCA S.P.A., Vittorio Veneto (IT)

(72) Inventor: Michele Donadini, Vittorio Veneto (IT)

( * ) Notice: Subject to any disclaimer, the term of this patent is extended or adjusted under 35 U.S.C. 154(b) by 292 days.

(21) Appl. No.: 16/759,726

(22) PCT Filed: Oct. 31, 2018

(86) PCT No.: PCT/IB2018/058546
§ 371 (c)(1),
(2) Date: Apr. 27, 2020

(87) PCT Pub. No.: WO2019/087102
PCT Pub. Date: May 9, 2019

(65) Prior Publication Data
US 2021/0370457 A1 Dec. 2, 2021

(30) Foreign Application Priority Data
Nov. 2, 2017 (IT) .......................... 102017000124508

(51) Int. Cl.
*B23Q 35/02* (2006.01)
*B23Q 35/42* (2006.01)
(Continued)

(52) U.S. Cl.
CPC ............. *B23Q 35/02* (2013.01); *B23Q 35/42* (2013.01); *G06K 7/10227* (2013.01);
(Continued)

(58) Field of Classification Search
CPC ........ B23Q 35/02; B23Q 35/42; B23Q 35/00; G06K 7/10227; G06K 19/0677;
(Continued)

(56) References Cited

U.S. PATENT DOCUMENTS

| | | | |
|---|---|---|---|
| 5,838,251 A * | 11/1998 | Brinkmeyer | ............ B60R 25/24 340/426.14 |
| 8,509,445 B2 * | 8/2013 | Rebuli | ............ B60R 25/04 380/277 |

(Continued)

FOREIGN PATENT DOCUMENTS

| EP | 1339024 | 8/2003 |
|---|---|---|
| WO | 2006032354 | 3/2006 |
| WO | 2017024043 | 2/2017 |

*Primary Examiner* — Edwin C Holloway, III
(74) *Attorney, Agent, or Firm* — Themis Law

(57) ABSTRACT

A method of obtaining a copy key includes the steps of acquiring characteristic parameters of the original using a detection system; identifying operating instructions to reproduce the characteristic parameters so acquired; requiring authorization to load into a duplicating machine and/or use by a duplicating machine the operating instructions for creating the copy key; only if the authorization is given, loading the operating instructions into the duplicating machine and/or making the operating instruction available for use by the duplicating machine; controlling the duplicating machine so as to obtain, on the basis of the operating instructions previously loaded and/or made available, at least one copy key; and after the at least one copy key is obtained, removing the operating instructions from the duplicating machine.

20 Claims, 2 Drawing Sheets

Figure 1:
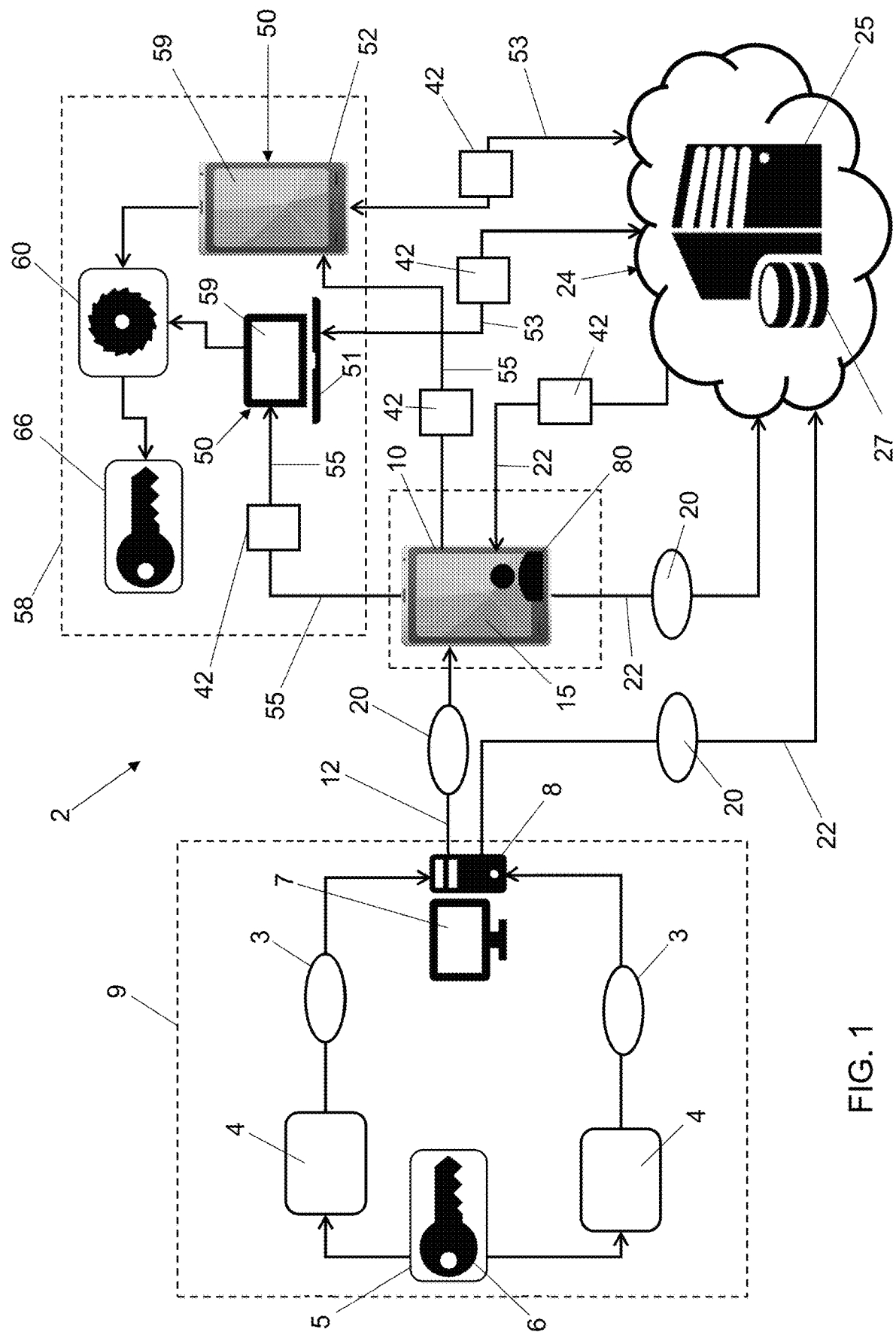

(51) Int. Cl.
*G06K 7/10* (2006.01)
*G07C 9/00* (2020.01)
*B23Q 35/00* (2006.01)

(52) U.S. Cl.
CPC ..... *G07C 9/00857* (2013.01); *G07C 9/00944* (2013.01); *B23Q 35/00* (2013.01)

(58) Field of Classification Search
CPC ............ G07C 9/00857; G07C 9/00944; G06Q 30/0621; G06Q 30/06; G06Q 20/18; B23C 2235/12
USPC .......................................................... 408/3
See application file for complete search history.

(56) References Cited

U.S. PATENT DOCUMENTS

| | | | | |
|---|---|---|---|---|
| 2003/0144759 | A1* | 7/2003 | Kawai | B23C 3/35 700/117 |
| 2009/0074528 | A1* | 3/2009 | Hadad | B23C 3/35 409/82 |
| 2013/0331976 | A1* | 12/2013 | Freeman | G05B 15/02 700/117 |
| 2014/0229317 | A1* | 8/2014 | Fagan | G06Q 30/0621 705/26.5 |
| 2015/0088694 | A1* | 3/2015 | Ackerman | G06Q 30/0641 705/28 |
| 2016/0004892 | A1* | 1/2016 | Marsh | G06Q 20/18 340/10.51 |
| 2017/0039447 | A1* | 2/2017 | Mutch | G06V 10/141 |

\* cited by examiner

METHOD AND INFRASTRUCTURE FOR THE DUPLICATION OF KEYS

The present invention relates to a method for the duplication of keys and an infrastructure which implements and uses this method.

Currently, to make a copy of a key it is necessary to have the original key available. Therefore, if the only original key is lost, there is no possibility of making a copy of it, unless the specific identification code of the original key has previously been acquired, which includes a plurality of information such as the type/model of the raw key, its profile and its encryption and, in the case of electronic keys, also includes the transponder data (for example related to the type of transponder in order to then identify the encryption algorithm) and/or the data contained in its memory (for example related to the secret code).

In this context, methods and IT infrastructures are already known to extract the identifying information from a key to store it in an appropriate database in order to make it subsequently available to the user when it needs a copy of said key, a copy that can therefore be obtained even without the original key.

In particular, the method of US2016/0004892 envisages a first phase in which only the data relating to the type of raw key to start from and the data relating to its encryption are acquired from a particular encrypted key; the data thus acquired are then stored in a database. Subsequently, when a copy of this key is desired, the previously acquired and stored data are downloaded from the database and are first used to select the type of raw key to start from and then to command the duplicating machine in an appropriate manner way to obtain an encryption corresponding to that of the downloaded data.

In particular, the method of US2014/229317 envisages the use of a kiosk which, by means of a camera or a digital scanner, acquires a digital or scanned image of the key in order to extract then, through an appropriate software module processing of the image, the geometric characteristics identifying the key itself. The extracted features are then saved in a database and appropriately associated with the account of the key holder so acquired.

According to this method, but also according to other methods currently available, when the user needs to obtain a physical copy of the key from the information stored in the database, the same user must necessarily be physically present at a key duplication center in order to obtain the physical copy of the key. Therefore, the user is free to go to any duplication center even if, generally, he chooses the one closest to him or convenient.

However, in this situation, it often happens that the duplication center to which the user addresses is not necessarily provided with the processing machines suitable for obtaining the physical copy of the particular key requested by the user and/or the particular raw key starting to obtain said copy is not available. Therefore, the user is forced to turn to another duplication center with the inevitable risk of being in the same situation again. It is easy to understand how this situation is rather unseemly and unwanted.

Furthermore, the known methods are not structured to guarantee an adequate security of the information acquired and relating both to the key and to the user to whom said key is associated. In particular, these methods do not perform an appropriate control of the access permissions of the users and/or of the acquisition and/or duplication centers.

WO2017/024043 describes a method for acquiring the information related to the geometry of the cuts provided on the surface of an encrypted key, to analyze and compare the information thus acquired with those known and stored in an appropriate database in order to identify the data—for example regarding the position and size of the cuts (and identified by a code matched with the known cylinders)—to be used then to be able to replicate the above-mentioned cut geometry on a new raw key.

WO2006/032354 describes a duplication method for encrypted keys in which—in order to guarantee a greater security standard and confidentiality—the duplication centers are connected to a central unit in order to transmit to the latter an indirect code related to the key to be duplicated and the identification data of the lock; duplication is performed only if the central unit has recognized the indirect code and the received identification data of the lock.

EP1339024 describes a method for handling requests for copies of keys by a user. In particular, this method involves associating a first code to each sold key and a second code to each user who has purchased said key. Therefore, when a user needs to obtain a copy of a key, he must provide both the first and the second code to the operator and the copy of the key will be performed only if the manager has correctly recognized the two codes so provided. More in detail, only in the latter case, the information relating to the encryption of the key to be duplicated is transmitted to a processor for appropriate control of an automatic duplicating machine.

The object of the present invention is to propose a method and an infrastructure for the duplication of keys which eliminate the aforementioned drawbacks present in the traditional art.

Another object of the invention is to propose a method and an infrastructure which do not require the user to have the original key available at the time of the duplication.

Another object of the invention is to propose a method and an infrastructure that provide the user with a certain indication of a duplication center capable of duplicating the required key.

Another object of the invention is to propose a method and an infrastructure that provide the user with the indication of the duplication center nearest to him and/or most convenient.

Another object of the invention is to propose a method and an infrastructure that provide the user with an indication of the duplication center which offers the most convenient price for the duplication of the key requested by him.

Another object of the invention is to propose a method and an infrastructure which guarantee adequate security both in data storage and in data transmission.

Another object of the invention is to propose a method and an infrastructure that provide an adequate security and confidentiality standard for the data necessary to obtain the user's keys, and this also with respect to the directors and operators of the acquisition/duplication centers.

Another object of the invention is to propose a method and an infrastructure which assure the duplication of the original key only by the legitimate holder or by an authorized party.

Another object of the invention is to propose a method and an infrastructure that are highly automated.

A further object of the invention is to propose a method and an infrastructure which guarantee an adequate control of the operators authorized to read the information.

Another object of the invention is to propose a method and an infrastructure which are an improvement and/or alternative to traditional ones.

Another object of the invention is to propose a method and an infrastructure with an alternative characterization, both in functional and implementation terms, with respect to the traditional ones.

Another object of the invention is to propose a method and an infrastructure that allows a lower resources consumption by the hardware devices involved and a lower use of the band occupied by the network.

Another object of the invention is to propose a method that is simple to use, easy and intuitive for users.

Another object of the invention is to propose an infrastructure that can be implemented in a simple, rapid manner and with low cost.

All these and other objects which will result from the following description are achieved, according to the invention, with the method having the characteristics indicated in claim 1 and with the infrastructure having the characteristics indicated in claim 17.

Figure 2:
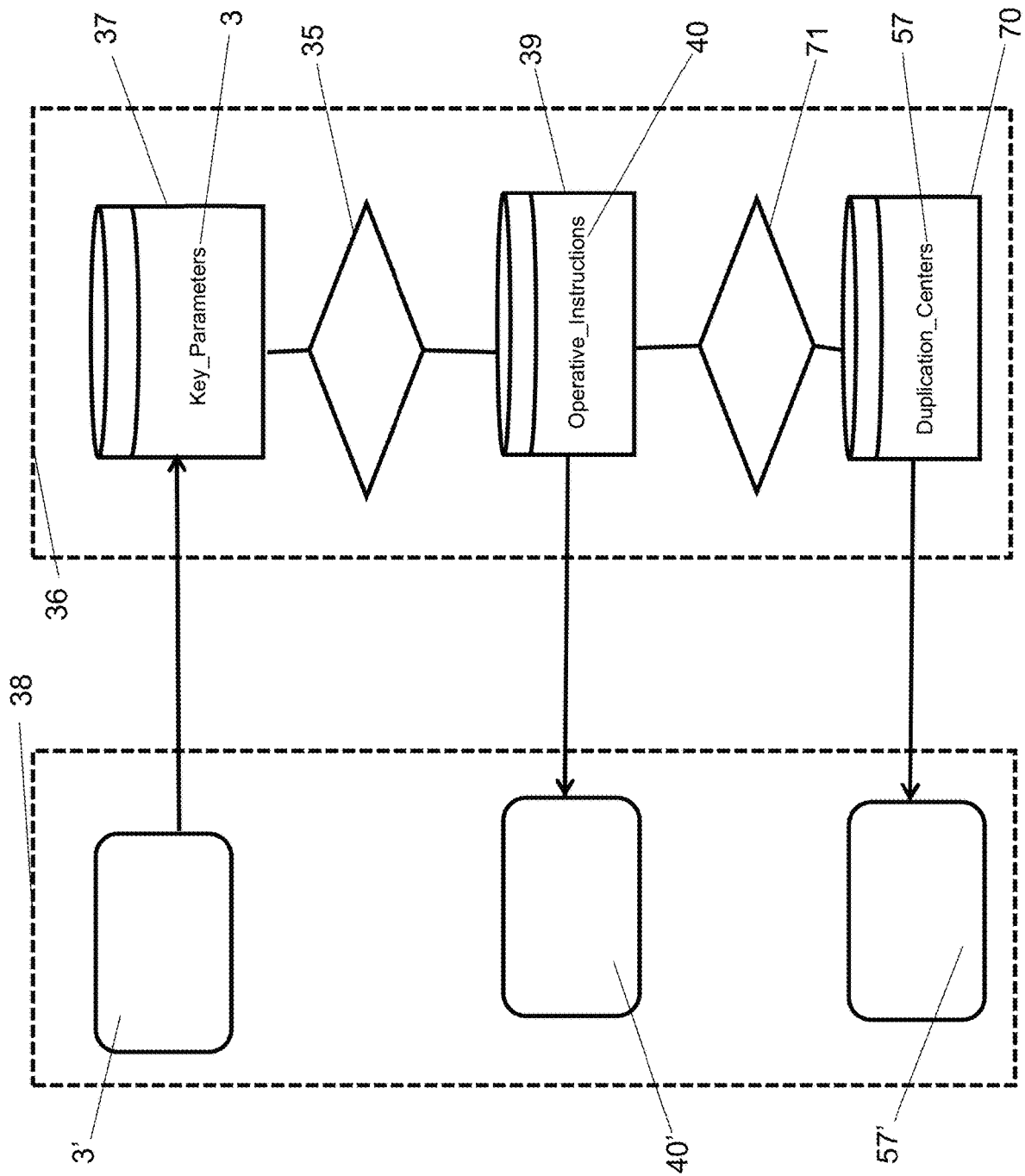

The present invention is hereinafter further clarified in a preferred embodiment thereof, given purely by way of non-limiting example with reference to the attached tables of drawings, in which:

FIG. 1 shows a schematic view of the IT infrastructure which implements the method according to the invention, and FIG. 2 shows a schematic view of a detail of the modules provided in the infrastructure according to the invention.

As can be seen from the figures, the infrastructure according to the invention, indicated as a whole with the reference number 2, comprises means 4 for detecting the characteristic parameters 3 of a key 5 starting from a physical sample 6 of the same.

In particular, for "characteristic parameters of a key" it is meant the combination of parameters that univocally describe the characteristics of each key and that are necessary—in the sense that they must be known—in order to be able to duplicate a particular key.

More in detail, in the case of a key 5 of an exclusively mechanical type (i.e. the traditional keys having a head and an encrypted stem), the characteristic parameters 3 comprise the model/type of the raw key and its encryption. In the case of a key 5 of an exclusively electronic type (for example access badges), the characteristic parameters 3 comprise the type of transponder and the data contained in its memory.

Suitably, in the case of a mixed key—such as a typical car key that is equipped with both an encrypted rod, as a mechanical key, to turn the lock cylinder, and electronic components, which are usually positioned in the head of the key, and are used to open the car doors and allow the deactivation of the immobilizer of the latter—the characteristic parameters 3 include both the model/type of raw key and its relative encryption, and the type of transponder and the data contained in its memory.

Appropriately, in the case of an electronic key with radio remote control for cars or other vehicles, the characteristic parameters 3 include the vehicle chassis number, or alternatively the brand, model, registration year of the car or vehicle, and the frequency of operation of the radio control. Preferably, in this case, the characteristic parameters 3 also comprise an image of the remote control.

Appropriately, in the case of an electronic proximity key for cars or other vehicles, or in the case of a radio remote control alone (for example, for gate automation or up-and-over door), the characteristic parameters 3 comprise at least radio transmitter brand and model, and its operating frequency. Preferably, the characteristic parameters 3 comprise an image of the radio control.

Conveniently, in the case of mechanical or mixed key 5, the means 4 for detecting the characteristic parameters 3 of the key comprise optical devices (for example a camera and/or an optical reader) which are appropriately configured to acquire one or more images of the key 5, from which it is then possible obtain the aforementioned characteristic parameters through appropriate software module methods. For example, said detection means 4 are incorporated in a machine, such as the one described in WO 2015/010936, and/or in an apparatus, such as the one described in WO 2008/071619, which allow detecting the profile and/or the key encryption. The content of both these patent documents is understood to be here entirely incorporated by reference. Advantageously, the means 4 for detecting the characteristic parameters of the key 5 may comprise mechanical devices, such as for example a probe, and/or a laser meter.

Conveniently, in the case of key 5 of the electronic or mixed type, the means 4 for detecting the characteristic parameters 3 of such key comprise for example a method and/or procedure such as those described in WO2011/039148, or WO2016/012604 or in the application of Italian Patent No. 102016000029205. The content of all these three documents is understood to be here entirely incorporated by reference.

Conveniently, the detection means 4 are associated and connected to a first device 8, preferably comprising or consisting of a central processing unit (CPU). Preferably, the first device 8 is a computer. Advantageously, the first device 8 can also be incorporated inside the machine which is provided with said detection means 4. Advantageously, the first device 8 is also provided with its own display 7 on which to display the characteristic parameters 3 of the key 5 acquired by means 4.

Conveniently, the detection means 4 can be automatic and/or semi-automatic. In particular, in the case of semiautomatic detection means, means are provided for manual insertion by the operator of some characteristic parameters 3 of the key 5, such as for example the identification code of his profile.

Conveniently, in the first device 8 a first software module is loaded and executed.

Conveniently, the detection means 4 and the first device 8 are located in a first acquisition center 9. Preferably, a plurality of acquisition centers 9 are provided which are suitably distributed throughout the territory to be served.

The infrastructure 2 according to the invention also comprises a second device 10, preferably portable (for example a mobile phone, smartphone, tablet, etc.). Conveniently, the second device 10 comprises or consists of a CPU. Preferably, the second device 10 is managed by the user 80 who is the owner/manager of the key 5 and who went to the acquisition center 9.

Advantageously, according to an embodiment not shown here, the same portable device 10 can be provided with the detection means 4 of the characteristic parameters 3 of the key 5. For example, these detection means 4 comprise optical sensing means 14, for example a digital camera, to acquire at least one digital image (photograph) of the key 5. Advantageously, from the digital image it is possible to extract, through appropriate software module processing, the characteristic parameters 3 of the key itself.

Advantageously, the first device 8 and/or the second device 10 are associated, or are incorporated, with first communication means 12. Preferably, the communication means 12 comprise short-range transmission means (i.e. of the order of tens of centimetres up to one meter), such as those using NFC technology ("Near Field Communication")

or transponder, for example of RFID type ("Radio-Frequency IDentification") or, also, transmission means using the Bluetooth standard. These short-range communication means 12 are inherently traditional but have never been used for the purposes that are achieved in this specific application. Correspondingly, the communication means 12 comprise short-range receiving means, not shown, which use the NFC technology or RFID transponders or the Bluetooth standard.

Alternatively, the communication means 12 between the first device 8 and the second device 10 can use the internet network and/or the mobile phone technology (with standards such as GSM, UMTS, GPRS, etc.) and/or use a cable connection or data transfer via mass storage (e. g. via USB drives, optical discs, memory cards, etc.).

Advantageously, the first software module of the first device 8 is configured to generate a data packet 20 which is relative/representative and/or contains the characteristic parameters 3 of the key 5 identified by means of the detection means.

Advantageously, the generated data package 20 is sent to the second device 10 by the communication means 12 of the first device 8. Preferably, by approaching the second device 10 to the first device 8, said second device is able to acquire the data package 20 which is generated by the first device 8.

Conveniently, a second software module can be loaded and executed within the processor of the second device 10.

Preferably, the second software module can be configured to represent on the display 15 of the device itself, in an orderly and suitably formatted manner, the data package 20 received from the first device 8. Advantageously, the data package 20 comprising the characteristic parameters 3 of the key 5 can also be automatically stored locally in a memory unit provided for this reason in the second device 10.

Advantageously, the second device 10 is provided with second communication means 22 for sending the data package 20, received from the device 8, to a remote storage and/or processing unit 24. In particular, the remote unit 24 comprises at least one memory unit 27 with a corresponding processor, which for example is defined by one or more real or virtual remote computers and/or servers 25.

Conveniently, the second communication means 22 between the second device 10 and the remote unit 24 can use the cellular mobile phone technology (with standards such as GSM, UMTS, GPRS, etc.) and/or the internet. Preferably, the communication means 22 use secure communication protocols, such as, for example, the TLS or SSL protocols.

Advantageously, inside the remote unit 24, the data packages 20 are conveniently stored and archived in an organized manner in order to allow easy interrogation and use thereof, even after a certain time. Preferably, the data packages 20 stored in the remote unit 24 are protected by means of appropriate IT security means or procedures.

Preferably, when the second device 10 consists of a smartphone or tablet, the second software module loaded and executed within this is a suitable mobile software module application (APP). Advantageously, the APP is configured to allow communication and/or exchange of data and/or information directly between the device itself and the remote unit 24. Appropriately, the same APP is also configured to perform processing and the formatted representation of the data package 20 on the display 15 of the second device 10.

Advantageously, the first device 8, located and managed by the acquisition center 9, can be provided with said second communication means 22 for sending the relative data package 20 and/or representative of the characteristic parameters 3 of the key 5 acquired through the detection means 4 directly to the remote unit 24 (i.e. without the intermediation of the second device 10).

Advantageously, at least one software module configured to implement a control/authorization procedure (i.e. to allow or not) the activation of the detection means 4 and/or the start of the acquisition phase of the characteristic parameters 3 of the key 5 through said detection means 4.

Preferably, the software module loaded and executed in the remote unit 24, the second software module loaded and executed in the second device 10 and the first software module loaded and executed in the first device 8 are configured to interact to implement said authorization procedure for the acquisition of the characteristic parameters 3 of the key 5 by means of the detection means 4, and this in order to assure the user 80 (which manages the second device 10 and which is the owner/legitimate holder of the key 5) that the acquisition phase is performed safely and authorized.

Advantageously, the second software module is configured to control the activation of the detection means 4 and/or the start of the acquisition phase of the characteristic parameters 3 only following the reception, by said second device 8, of an authorization signal sent by the second device 10 and/or manually inserted in said first device 8.

More in detail, advantageously, in order to implement such authorization procedure, the software module loaded and executed in the remote unit 24, the second software module loaded and executed in the second device 10 (which is managed by the user 80 which is the owner/the legitimate holder of the key 5) and the first software module loaded and executed in the first device 8 (which is managed by the operator of the acquisition center 9) are configured to perform the following operations:

the second software module loaded and executed in the second device 10 sends a request to the remote unit 24; opportunely, this request also includes an indication of the type of operation required which, in this case, concerns the acquisition of the characteristic parameters 3 of a new key;

after this request, the software module loaded and/or executed on the remote unit 24 generates an authorization code; suitably, this code is memorized, at least temporarily, in said remote unit 24 in association with the data of said request (and therefore also with the type of operation requested) and, moreover, is sent to the second software module of the second device 10 which carried out the request;

the first software module of the first device 8 receives said authorization code, code that the second software module of the second device 10 had received from the remote unit 24; in particular, this may occur by communication means and typing of said authorization code on the user interface of said first device 8 by the user 80 and/or of the operator of the acquisition center 9 who read it on the display of the second device 10, or it can occur by direct sending to said first device 8 by the second device 10, after receiving the authorization code, the first software module of the first device 8 sends it to the software module loaded and/or executed on the remote unit 24, the software module loaded and/or executed on the remote unit 24 checks whether the authorization code received from the first device 8 corresponds to the one initially created and sent to the second software module of the second device 10; if this verification is successful, it generates a first request signal and sends it to the second software module of the second device 10, the second software module of the second device 10 receives from the remote unit 24 the first request signal and, through the graphic interface of said second device, requests the user 80 to send (directly or through the remote unit 24) a command signal to the first device 8 to start the acquisition phase, the first software module of the first device 8 receives the command signal and, accordingly, initiates the acquisition phase of the characteristic parameters 3 of the key 5 by means of the detection means 4.

This authentication procedure serves to guarantee the user 80—who is entitled, as the legitimate owner/manager of the key 5, to request the acquisition, and subsequent storage, of the characteristic parameters 3 of said key 5—that an effective control, through protected and secure authorization, on the operations of acquisition and memorization of the characteristic parameters 3 of said key 5 is put in place.

Preferably, the authorization code is generated randomly by the loaded software module and executed in the remote unit 24.

Advantageously, the software module loaded and/or executed on the remote unit 24 is configured to create said authorization code and to associate it with a time interval (duration) for its validity (for example a few minutes) so that, after said interval, the code does is not more valid anymore and/or no longer verifiable (that is, for example, it is deleted from the internal memory of the remote unit 24, thus removing any possibility of subsequent verification). In particular, for greater security, the software module loaded and/or executed on the remote unit 24—apart from checking whether the authorization code received from the first device 8 corresponds to the one initially created and sent to the second software module of the second device 10—is configured to check if the time elapsed between the creation of the authorization code (and/or sending this to the second software module of the second device 10) and receiving said code (which was sent to the remote unit 24 from the first device 8) is less than a certain predefined time interval; opportunely, only if the aforementioned interval is lower than the predefined one, it generates a first request signal and sends it to the second software module of the second device 10.

Appropriately, the fact that the authorization code is created and verified by the software loaded and/or executed on the remote unit 24 allows the latter to be able to handle several requests at the same time by more than one device 10; in fact, in this way, for each request sent by a second device 10 to the remote unit 24 a unique authorization code is created and associated.

Appropriately, the second software module that is loaded and executed in the second device 10 managed by the user 80 (which is the legitimate owner/manager of the key 5 and which has gone to the acquisition center 9) is configured to receive the authorization code created by the remote unit 24 and to display this code on the display 15 of said second device 10. Conveniently, the first software module of the first device 8 is configured to receive the authorization code upon entering the code itself on the user interface of said first device 8. Advantageously, in this case, the authorization code is shown on the display 15 of the second device 10 to allow a subject—for example to the user 80 and/or to the operator of the acquisition center 9—to read and type this code accordingly on the user interface of the first device 8.

Advantageously, in a different embodiment (which may be additional or alternative to the one described above), the authorization code created by the remote unit 24 and received by the second device 10 can be sent directly to the first device 8 by the first communication means 12.

The infrastructure 2 also comprises a database 36 comprising a parameter dataset 37, which contains all the possible characteristic parameters 3 of the keys 5, and an instruction dataset 39, which contains all the possible operating instructions 40 necessary for obtaining a key.

Advantageously, the operating instructions 40 comprise at least the following data:

the identification data of the type of raw key to start from, data relating to the operating instructions/commands to be supplied to the duplicating machine to obtain that particular encryption (both mechanical and electronic).

Preferably, the operating instructions 40 comprise the following data:

data relating to the duplicating machine to be used for encryption, data identifying the cutter or mill to be used for encryption, data identifying the type of clamps or jaws to be used to lock the key during milling, the data relating to the operating instructions/commands to be supplied to the duplicating machine in order to obtain that particular encryption (both mechanical and electronic), data relating to the operating instructions/commands to be supplied to the duplicating machine to obtain that particular encryption (both mechanical and electronic).

Preferably, the operating instructions 40 also include the data identifying the mechanical probe used to detect the encryption during acquisition of the characteristic parameters 3 of the key 5.

Conveniently, the database 36 is configured and structured so that the parameter dataset 37 and the instruction dataset 39 are associated with each other by a relation 35 (which substantially constitutes another dataset) containing the specific operating instructions 40 necessary to obtain a specific combination of characteristic parameters 3 of the key. In other words, in the database 36 the characteristic parameters 3 of the keys are associated/matched with the corresponding operating instructions 40 necessary/required to obtain these parameters.

Conveniently, the database 36 is provided, in a traditional way, with supports for data storage and a processor for processing these data (database servers) and software applications (i.e. a database management system) for the creation, manipulation, efficient management of data stored on the media.

The infrastructure 2 also comprises an interrogation software module 38 of the database 36 with the specific characteristic parameters 3' (input) acquired through the detection means 4 in order to extract the corresponding specific operating instructions 40' (output) necessary to obtain a key 5 having that specific combination of characteristic parameters 3'. Advantageously, the presence/combination of the memory unit 36 and of the interrogation software module 38 make it possible to translate/transform the specific characteristic parameters 3' of each key 5 into the corresponding specific operating instructions 40' necessary to obtain them.

Advantageously, according to the invention, the database 36 and the interrogation software module 38 can both be loaded and executed on the first device 8, or the database 36 can be loaded in the remote unit 24 while the interrogation software module 38 can be loaded and performed on the first device 8 and/or on the second device 10. In both these cases, however, the operating instructions 40, extracted by said interrogation software module 38, are inserted in the data package 20 which is transmitted by the first device 8, by means of the second communication means 22, directly to the remote unit 24 where it is archived or is first transmitted to the second device 10 by means of the first communication means 12 and, subsequently, by the second communication means 22 is sent by the second device 10 to the remote unit 24 to be stored within the latter.

Preferably, the database 36 and the interrogation software module 38 can both be loaded and executed in the remote unit 24. In this case, the data package 20 received from the remote unit 24 contains the specific characteristic parameters 3' of the key 5, to be used to interrogate, through module 38, the database 36 so as to extract from the latter the corresponding specific operating instructions 40 which are then opportunely stored in the remote unit 24.

Conveniently, a plurality of data structures 42 (records) are provided within the memory unit 27 of the remote unit 24, one for each key 5 that has been acquired by means of the detection means 4. In particular, each data structure 42 comprises a unique identifying field of the key 5 and one or more fields containing the corresponding operating instructions 40 for obtaining this key, instructions which have been extracted from the interrogation module 38 appropriately querying the database 36. Conveniently, the identification field of the key 5 provided in the data structure 42 can be a unique code, which is assigned randomly or predetermined by a suitable software provided in the remote unit 24, and/or may be an image of the key 5.

Preferably, the data structure 42 also includes a field containing the characteristic parameters 3 acquired through the detection means 4 and present in the data package 20 received from the remote unit 24. Conveniently, the data structure 42 can comprise other data such as a photographic image of the key, the alphanumeric code that identifies the encryption of the key (for example in the case of keys belonging to a mastered system or with a master key) or a photographic image of that code, as well as other useful accessory information, such as a label relative to the use destination of the key.

Conveniently, within the memory unit 27 of the remote unit 24, the data structures 42 (records) of each key 5 are organized and combined with one or more users, which substantially correspond to the owners/managers of each key.

Advantageously, in the second device 10—which is managed by a user 80 who is the legitimate owner/user of one or more keys 5—a simplified data structure 43 can also be stored locally, comprising at least the following data:

a unique identification field of each key 5 acquired; appropriately, this unique identification field of the simplified data structure 43 is the same as provided in the data structure 42 stored in the remote unit 24 so as to allow the mutual association/connection between the two data structures 42 and 43, at least one photographic image of each key 5 acquired, at least one tag for each key 5 acquired; preferably, said label contains at least in part information relating to the intended use of each acquired key.

Preferably, the second software module loaded and executed in the second device 10 is configured to display in an ordered manner the simplified data structure 43 of each key 5 combined with the user 80 which manages the second device 10.

Conveniently, the simplified data structure 43 can be created and stored during the acquisition of the characteristic parameters 3 of the key 5 by means of the detection means 4 and/or can be downloaded from the remote unit 24 once the latter has been memorized the corresponding data structure 42 relative to a given key 5.

The infrastructure according to the invention further comprises at least a third device 50, which preferably comprises or consists of a processor. Preferably, the third device 50 is a computer 51 and/or a portable device 52, for example smartphones, tablets, etc.

Conveniently, a third software module is loaded and executed inside the third device 50.

Conveniently, the third device 50 comprises the control device of a duplicating machine 60.

Conveniently, the third device 50 is located in a duplication center 58 which key users can contact when they need to obtain a copy key 66 of an original key 5, of which the characteristic parameters 3' have been acquired by means of the detection means 4 and of which the corresponding operating instructions 40' have been filed in the remote unit 24. Preferably, a plurality of duplication centers 58 are provided which are suitably distributed throughout the territory to be served.

The third device 50 is provided and/or associated with its own display 59 for displaying the content of the data structure 42, which has been downloaded from the remote unit 30, and thus selecting the raw key from which to obtain the copy key 66.

Advantageously, the third device 50 is connected and/or incorporated in a traditional duplicating machine 60, which can be mechanical or, preferably, electronic, of mechanical or electronic keys which, in order to obtain the copy key 66 starting from the selected raw key is appropriately controlled on the basis of the operating instructions 40 contained in the data structure 42 which was downloaded/obtained by the remote unit 24 following the request made/sent by the first device 8 and/or by the third device 50. Suitably, the duplicating machine 60 may include a machine that uses/implements 3D printing technology.

Preferably, the third device 50 corresponds to the processor (control unit) of the duplicating machine 60. Advantageously, the display 59 of the third device 50 corresponds to the display of the duplicating machine 60.

Conveniently, it is also understood that the third device 50 may also be independent from the control device of the duplicating machine 60, which can be either mechanical or electronic. In this case, the operating instructions 40, contained in the data structure 42, are simply displayed on the display 59 of the third device 50 so that they can then be followed step by step by the operator and/or so that they can then be transferred by the third device 50 to the control device of the duplicating machine 60.

Conveniently, in the case of mechanical keys, the duplicating machine 60 comprises one or more drills for carrying out the mechanical encryption of the raw key whereas, in the case of electronic keys, the duplicating machine 60 comprises a traditional device for writing (i.e. sending and storing) inside the transponder of the raw key the configuration codes necessary for its operation as copy key of the original key 5. In the case of mechanical and electronic mixed keys, a single duplicating machine 60 may be provided, comprising both cutters for the mechanical coding of either an electronic writing device, or two distinct machines 60, one for mechanical encryption and one for electronic writing, which are used in sequence, can be provided.

Advantageously, the third device 50 is connected by means of third communication means 53 with the remote unit 24 in order to mutually exchange data and/or commands. Appropriately, the third device 50 is connected to the remote unit 24 by means of the third communication means 53 in order to request and downloading/obtaining directly from the latter a specific data structure 42 stored therein.

Preferably, the request of the data structure 42 is carried out using the identification field with which each key 5 is stored inside the remote unit 24.

Conveniently, the third device 50 can be connected to the remote unit 24 directly and/or indirectly through the second device 10 which communicates with said remote unit 24 by the second communication means 22. In particular, for this purpose, the second device 10 is connected to the remote unit 24 by means of the second communication means 22 also for the purpose of requesting and downloading/directly obtaining from it a specific data structure 42 which is stored in said unit 24. Further, the second device 10 is connected, by means of fourth communication means 55, with the third device 50 in order to transmit to the latter the data structure 42 downloaded from the remote unit 24.

Advantageously, the communication means 12, 22, 53 and/or 55 use mobile cellular telephone technology (with standards such as GSM, UMTS, GPRS, etc.) and/or the Internet, preferably by means of a secure connection.

Infrastructure 2 includes at least one software module configured to authorize/control (i.e. to allow or not):

the download from the remote unit 24 of the operating instructions 40 to be used to obtain a copy key 66 of a key 5 which have already been acquired, and/or the loading on a duplicating machine 60—and in particular on the third device 50 incorporated or associated with said duplicating machine—of the operating instructions 40 to be used to obtain a copy key 66 of a key 5 of which the acquisition has already been performed, and/or the use by a duplicating machine 60 of the operating instructions 40 to be used to obtain a copy key of a key 5 of which the acquisition has already been performed.

Advantageously, said at least one module configured to perform the aforesaid operations comprises the third software module which is loaded and executed in the third device 50.

Advantageously, in a preferred embodiment, the software module loaded and executed in the remote unit 24, the second software module loaded and executed in the second device 10 and the third software module loaded and executed in the third device 50 are also configured to implement an authorization procedure of said third device 50, and this in order to assure the user 80 (that manages the second device 10 and that wants to obtain a copy key 66 of a key 5 of which it is the legitimate owner/manager) that the step of obtaining/creating the copy key 66 is authorized and performed securely. Therefore, substantially, in this way, the possibility of obtaining, through said duplicating machine 60, a copy key 66 is either authorized or not.

In particular, the third software module is configured to command the download from the data structure 42 of the remote unit 24 containing the operating instructions 40 and/or the loading of the latter within the duplicating machine 60 and/or the execution of said operating instructions 40 by the duplicating machine 60 only after receiving, by said third device 50, an authorization signal sent to the latter by the second device 10 and/or manually inserted in said third device 50.

More in detail, in order to implement such authorization procedure, the software loaded and executed in the remote unit 24, the second software module loaded and executed in the second device 10 (which is managed by the user 80 which is the legitimate owner/manager of the key 5 for which a copy key 66 is to be obtained) and the third software module loaded and executed in the third device 50 (which is managed by the duplication center operator 58) are configured to perform the following operations:

the second software module loaded and executed in the second device 10 sends a request to the remote unit 24; opportunely, this request also includes an indication of the type of operation required and that, in this case, concerns the obtaining of a copy key 66 of a key 5 whose characteristic parameters 3 have already been acquired, after this request, the software loaded and/or executed on the remote unit 24 generates an authorization code; suitably, this code is memorized, at least temporarily, in said remote unit 24 in association with the data of said request (and therefore also with the type of operation required) and, furthermore, said code is sent to the second software module of the second device 10 which has made the request;

the third software module of the third device 50 receives the authorization code that the second software module of the second device 10 had received from the remote unit 24; in particular, this may occur by communication means and typing of said authorization code on the user interface of said third device 50 by the user 80 and/or by the operator of the duplication center 58 who reads it on the display of the second device 10, or it can be done by direct sending the code to said third device 50 by the second device 10, after receiving the authorization code, the third software module of the third device 50 sends it to the software loaded and/or executed on the remote unit 24, the software loaded and/or executed on the remote unit 24 checks whether the authorization code received from the third device 50 corresponds to the one initially created and sent to the second software module of the second device 10; if this verification is successful, it generates a first request signal and sends it to the second software module of the second device 10, the second software module of the second device 10 receives from the remote unit 24 the first request signal and, through the graphic interface of said second device, requests the user 80 to send to the remote unit a command signal to authorize the download of the operating instructions 40 by the third device 50 and their loading into the duplicating machine 60 and/or to authorize the latter to use said operating instructions 40, once the remote unit 24 has received the command signal, the download of the operating instructions 40 in said third device 50 is started and/or a signal is sent to start the operations by the duplicating machine 60 on the basis of said operating instructions.

This authentication procedure is needed to guarantee to the user 80—who is entitled, as the legitimate owner/manager of the key 5, to request and obtain a copy key 66 of the key 5—that an effective control is carried out, through a protected and secure authorization, on data recovery operations (i.e. their local download) and before starting the operations necessary to obtain the copy key 66.

Preferably, the authorization code is randomly generated by the software loaded and/or executed in the remote unit 24.

Advantageously, the software loaded and/or executed on the remote unit is configured to create said authorization code and to associate it with a time interval for its validity (for example a few minutes) so that, after this interval, said code is no longer valid and/o is no longer verifiable (i.e. it is deleted from the internal memory unit of the remote unit 24, thus preventing any possibility of subsequent verification). In particular, for greater security, the software loaded and/or executed on the remote unit 24—in addition to checking whether the authorization code received from the third device 50 corresponds to the one initially created and sent to the second software module of the second device 10—is configured to check if the time elapsed between the creation of the authorization code (and/or sending this to the second software module of the second device 10) and receiving said code (which is sent to the remote unit 24 by the third device 50) is equal to or less than a certain predefined time interval; opportunely, only if the aforementioned interval is lower than the predefined one, it generates a first request signal and sends it to the second software module of the second device 10.

Appropriately, the fact that the authorization code is created and verified by the software loaded and/or executed on the remote unit 24 allows the latter to be able to handle several requests at the same time by more than one device 10; in fact, in this way, for each request sent by a second device 10 to the remote unit 24 a unique authorization code is created and associated.

Appropriately, the second software module that is loaded and executed in the second device 10 managed by the user 80 (which is the legitimate owner/manager of the key 5 and which went to the acquisition center 9) is configured to receive the authorization code created by the remote unit 24 and to display this code on the display 15 of said second device 10. Conveniently, the third software module of the third device 50 is configured to receive the authorization code upon entering the code on the user interface of said third device 50. Advantageously, in this case, the authorization code is shown on the display 15 of the second device 10 to allow a subject—for example to user 80 and/or to the operator of the duplication center 58—to read and type this code accordingly to the user interface of the third device 50.

Advantageously, in a different embodiment (which may be additional or alternative to the one described above), the authorization code created by the remote unit 24 and received by the second device 10 can be sent directly to the third device 50 by the fourth communication means 55.

Advantageously, once authorized, the third software module of the third device 50 is configured to download/obtain directly from the remote unit 24—through the third communication means 53—a specific data structure 42 (containing the required operating instructions 40) stored in it.

Advantageously, the third software module of the third device 50 is configured to display on its display 59 a portion of the operating instructions 40 contained in a specific data structure 42 which has been downloaded/received.

Preferably, the third software module of the third device 50 is configured to display on its display 59 one or more of the following data:

the identification data of the type of raw key to start from, and/or data concerning the duplicating machine to be used for encryption, and/or data identifying the cutter or mill to be used for encryption, and/or the data that identify the type of clamps or jaws to be used to lock the key during milling.

Preferably, the third software module of the third device 50 is configured not to display on the display 59 the data relating to the operating instructions/commands to be supplied to the duplicating machine in order to obtain that particular encryption (both mechanical and electronic). In particular, these data relating to the encryption to be obtained are sent to the duplicating machine 60 and/or are used by the latter, without being in any way shown on the display 59. Suitably—in the event that part of the aforementioned data, which are relating to the operating instructions/commands to be supplied to the duplicating machine to obtain that particular encryption, should serve to guide the operator in the duplication operation—only that part of the data is shown on the display 59. Therefore, not displaying any of the aforementioned data or displaying them at most only partially but never in their entirety, it ensures appropriate confidentiality of the most sensitive data relating to the copy key 66 to be obtained, thus preventing an attacker (as well as the operator of the duplication center) from reading such data on the display 59 and know how to get a certain encryption.

The infrastructure 2 comprises a third software module configured so that—once at least one copy key 66 has been obtained through said duplicating machine 60—the operating instructions 40', which have been previously received/obtained and have been used by said duplicating machine 60 to create said at least one copy key 66, to be removed/deleted by the duplicating machine 60, and in particular by the third device 50 incorporated or associated with said duplicating machine. Preferably, once at least one copy key 66 has been obtained through said duplicating machine 60, the operating instructions 40' are automatically removed/deleted, i.e. in the sense that no operation or intervention by the operator is required to control such removal/deleted.

Advantageously, the third software module of the third device 50 is configured to automatically delete from its internal memory unit—once the duplicating machine 60 has used the operating instructions 40 to perform the processing necessary to obtain at least one copy key 66—the corresponding operating instructions 40 downloaded and used to obtain on the copy key 66 an encryption corresponding to that of the key 5 to be duplicated. Conveniently, this ensures appropriate security and confidentiality of the data, also preventing an attacker (as well as the operator of the duplication center) from obtaining a further unauthorized copy key 66 not authorised by the user that is the legitimate owner.

Preferably, the third software module is configured so that the operating instructions 40 which are deleted and removed comprise at least or only the data related to the operating instructions to be supplied to a specific duplicating machine 60 to obtain a specific code.

Advantageously, if it is necessary to obtain at least two copy keys 66, the third software module of the third device 50 is configured to automatically delete from the internal memory unit the data downloaded and related to the operating instructions/commands to be supplied to the duplicating machine 60 to obtain the determined encryption, only after a number of machining operations corresponding to the number of copy keys 66 to be obtained have been carried out in sequence.

Advantageously, in this case, during the authorization step the third software module of the third device 50 receives an indication of the number of copy keys to be obtained in order to program the removal/cancellation of the operating instructions only after the duplicating machine 60 has used the aforementioned operating instructions received a number of times corresponding to the number of copy keys to be obtained.

Advantageously, the third software module of the third device 50 is configured to automatically delete from its internal memory unit, upon receipt of a corresponding a command for interrupting operation that the duplicating machine 60 is performing/has performed, the operating instructions 40 downloaded and, in particular, the data relating to the operating instructions/commands to be supplied to the duplicating machine 60 to obtain a certain encryption. Conveniently, the interruption command can be sent to the third device 50 acting directly on the interface of said third device 50 or it can be sent to the third device 50 by the second device 10 through the fourth communication means 55.

Advantageously, a further verification procedure (check) is also provided for the authorization of a duplicating machine 60 to carry out and/or start and/or continue the processing (job) envisaged in order to obtain a copy key 66. Conveniently, such verification can be performed before and/or during and/or at the end of the processing (job) performed by the duplicating machine 60 in order to obtain the copy key 66.

In order to implement this verification procedure, the third software module of the third device 50 and the software loaded and executed in the remote unit 24 are conveniently configured to mutually interact with the fourth communication means 55 in order to perform such operations:

the third software module of the third device 50 sends a control signal to the software loaded and/or executed on the remote unit 24, the software loaded and/or executed on the remote unit 24 verifies the correctness of this control signal and, if this verification is successful, generates and sends to the third software module of the third device 50 a corresponding authorization or interruption signal, if the software module of the third device 50 receives an authorization signal, said software module controls the duplicating machine 60 to start and/or continue the machining operation required to obtain the copy key 66; otherwise, if the software module of the third device 50 receives an interrupt signal, said software module commands the duplicating machine 60 to immediately interrupt the processing provided for obtaining the copy key 66 and, preferably, commands the cancellation of the operating instructions 40 that the duplicating machine 60 is using/used.

This verification procedure serves to allow the user 80—who is entitled, as the legitimate owner/manager of the key 5, to request and obtain a copy of the key—to revoke a previously authorized duplication operation.

Conveniently, the database 36 and the interrogation software module 38 can both be loaded and executed in the third device 50. In this case, the data package 20 sent by the first or second devices 8 or 10 to the remote unit 24 substantially contains only the specific characteristic parameters 3 of the key 5 and, correspondingly, the data structure 42 that the third device 50 downloads from the remote unit 24, directly or through the second device 10, contains the specific characteristic parameters 3' of the key 5 to be used to interrogate, by means of the module 38, the database 36 so as to extract from the latter the corresponding specific operating instructions 40 to be used for controlling the duplicating machine 60.

Conveniently, while the database 36 can be loaded into the remote unit 24, the interrogation software module 38 can be loaded and executed in the third device 50. In this case, the data package 20 sent by the first or second devices 8 or 10 to the remote unit 24 contains the specific characteristic parameters 3' of the key 5 and, correspondingly, the data structure 42 that the third device 50 downloads, directly or through the second device 10, from the remote unit 24, contains the specific characteristic parameters 3' of the key 5 from use to interrogate, through module 38, the database 36 loaded in the remote unit 24 so as to extract and download from it the corresponding specific operating instructions 40 to be used then to control the duplicating machine 60.

Conveniently, within the database 36 a duplication center dataset 70 is also provided containing the identification and useful data of all the duplication centers 58, preferably of all the duplication centers registered and belonging to a certain network. In essence, each duplication center 58 defines a location which is characterized by the presence of one or more specific duplicating machines 60.

Conveniently, each duplication center 58 is uniquely identified within the database 36 by means of a corresponding univocal identification code provided in the dataset 70. Furthermore, the data 57 contained in the dataset 70 relate to the position of the duplication center 58, preferably expressed in GPS coordinates. and/or concerning the opening hours of the center itself and/or the prices requested by the user to obtain a copy key, etc.

Conveniently, the database 36 is also configured and structured so that the instruction dataset 39 and the duplication center dataset 70 are associated with each other by a relation 71 (which substantially constitutes another dataset) so as to define whether a certain duplication center 58 is able to implement certain specific operating instructions 40 (and therefore is able to provide a key with certain characteristic parameters 3). In other words, in the database 36 the operating instructions 40 are appropriately associated/combined with data 57 of the duplication center(s) 58 which are equipped to implement these instructions, in the sense, for example, that they have at their disposal that particular type of raw key to start from or having a particular duplicating machine, etc.

Advantageously, the interrogation software module 38 is also configured in such a way that, on the basis of the specific characteristic parameters 3' of a certain key 5' of which a copy key 66 is to be made, it interrogates the database 36 accordingly in order to extract, in addition to the corresponding specific operating instructions 40', also the data 57' of the center or the duplication centers which are able to implement these operating instructions.

Advantageously, the interrogation software module 38 is also configured so that, receiving the input from the second device 10 (which is managed by the user 80 who needs to obtain a copy key 66) the position, preferably expressed according to the GPS coordinates, of the device itself, it selects the data 57 of the key duplication center (s) 58 which are geographically closer to/convenient for the second device 10 (and therefore for the aforesaid user 80).

Conveniently, the data 57 of the duplication centers 58 are selected, within the database 36, among those able to implement the operating instructions 40 necessary to obtain a copy key 66 of a certain type of key 5 and/or those that are open/operational in a certain time window (both current and future) and/or those that offer the cheapest price. Conveniently, the interrogation software module 38 is configured to select and/or sort the data 57 of the duplication centers 58 provided in the database 36 according to one or more criteria, such as for example distance with respect to a certain reference position, opening times, price required for duplication, etc.

Conveniently, inside the devices 8, 10, 50 or remote unit 24, software modules are loaded and executed to update both the data 40 and 57 and the relations 35 and 71 between the data sets 37, 39 and 70 contained in the database 36. In particular, these modules are configured to insert in the data set instructions 39 of the new operating instructions 40 and to replace and/or add to the previous relations 35 the new relations that associate/match the characteristic parameters 3 of the keys the new instructions 40 thus inserted. Furthermore, these update modules are configured to insert the new data 57 relating to the duplication centers 58 into the dataset 70 and to replace and/or add to the previous relations 71 the new relations that associate the new data 57 with the operating instructions inserted. Advantageously, the presence of such updating modules allows modifying and keeping updated the content in the database 36 against, for example, the inevitable technological evolutions of the sector. For example, in the case in which a new duplicating machine 60 is proposed on the market well after the acquisition of the characteristic parameters 3 of a certain key 5 and that new duplicating machine 60 is able to encrypt this key, the updating software modules are used to intervene in the database 36 and by introducing new operating instructions 40 relating to this new duplicating machine 60 and associating them through a new relation 35 to the characteristic parameters 3 of the aforementioned key, and by introducing new data 57 relating to the duplication centers 58 provided new duplicating machine 60 and associating them by means of a new relation 71 to the instructions 40 introduced.

Advantageously, the infrastructure 2 also comprises a software module for correcting and optimizing the characteristic parameters 3 of a key 5 acquired through the detection means 4. Preferably, this correction and optimization software module is configured to correct/optimize the values of the encryption. of the key 5 acquired through the detection means 4 and, in particular, to correct/optimize the values relating to the depth and/or position of the notches defining said encryption.

In more detail, this correction/optimization software module is configured for:

identify the normal/standard values, appropriately pre-stored, that are closer and/or more appropriate than the acquired values relating to the depth of the notches that define the encryption, modify the acquired values bringing them to the normal/standard values thus identified, which will then be used to define the corresponding operating instructions 40.

This is particularly advantageous in the case of particularly worn or dirty keys, in which cases the detection of the depth of the notches defining the encryption may be altered.

Appropriately, this correction and optimization software module can be loaded and executed on the first device 8 and/or on the second device 10 and/or on the remote unit 24 and/or on the third device 50.

The method for the key duplication according to the invention implemented by means of the now described infrastructure provides a sequence of operating steps, which are listed and described hereinafter.

In a first step (also called "acquisition" step), the user 80, which owns and manages the second device 10, goes to an acquisition center 9 where, through the detection means 4, the characteristic parameters 3 of one or more keys 5 of the user 80 are acquired, starting from the corresponding physical samples 6 of the same. Appropriately, the start of the acquisition step by the detection means 4 is subject to a control/authorization procedure, as described above, carried out between the first software module of the first device 8, the second software module of the second device 10 and the software loaded and/or executed on the remote unit 24.

In particular, the characteristic parameters 3 of each key 5, thus acquired by the detection means 4, are received by the first device 8 managed by the acquisition center 9.

The first device 8, on the basis of said characteristic parameters 3, generates a corresponding data package 20 which is then sent, preferably by means of the first communication means 12, to the second device 10 of the user 80, which then sends it to the unit remote 24 by means of the second communication means 22. Conveniently, it can also be provided that the first device 8 directly transmits (i.e. without the intermediation of the second device 10) the data package 20 to the remote unit 24.

Conveniently, within the remote unit 24, the received data packages 20 are appropriately stored and archived in order to allow a convenient interrogation and deferred use.

Further, by means of the interrogation software module 38—which is loaded and executed in the first device 8 and/or in the second device 10 and/or in the remote unit 24—they are extracted from the memory unit 36, starting from the specific characteristic parameters 3' of each key 5, the corresponding specific operating instructions 40' necessary to obtain that specific combination of characteristic parameters 3'.

The operating instructions 40' thus extracted are then archived, in an organized and consultable manner, within the memory unit 27 of the remote unit 24 so that, to each key 5 which has been acquired by means of the detection means 4, is associated a corresponding data structure 42 (record) as previously described.

In a second step (also called "duplication" step), which is subsequent to said first step, the user 80 needs to obtain a copy key 66 of a particular key 5 which has been previously acquired and stored in said remote unit 24 during said first step.

Then, the user 80 acting on the second device 10 interrogates the remote unit 24 so as to identify, among all the keys associated with it, the one of which a copy 66 is to be obtained. Preferably, the interrogation of the remote unit 24 is carried out using the identification field of the data structure 42 with which each key 5 is stored inside the remote unit 24.

Once identified, again using the second device 10, the user downloads from the remote unit 24 in his device 10 the corresponding data structure 42, which is associated with the key 5 of which a copy key 66 is to be obtained.

Advantageously, based on the user 80 position and the specific operating instructions 40' necessary to implement the key for which a copy is to be obtained, the user himself receives on his device 10 also an indication of the duplication center 58 which is capable of implementing those specific operating instructions 40' and/or which is geographically closer to him or more convenient and/or which is open/operational in a certain time window and/or which presents the most convenient duplication prices.

The user 80 sends, by communication means 55, the data structure 42 downloaded onto his device 10 to the third device 50 which is managed by the duplication center 58.

Then, at the duplication center 58, on the basis of the operating instructions 40 contained in the data structure 42, the corresponding raw starting key is selected and withdrawn (manually or automatically, for example by means of robotic arms) and the specific duplicating machine 60 capable of generating a copy key 66 having a specific combination of characteristic parameters 3 is selected. Conveniently, the operating instructions 40 provided in the data structure 42 also contain the machining commands which are thus sent and/or loaded into the duplicating machine 60, and used by the latter in order to obtain a copy key 66 of the key 5 request.

Once the copy key 66 has been obtained at the duplication center 58, it can be physically withdrawn by the user 80 by going to the center itself or it can be physically sent from the duplication center 58 to a user 80 address Therefore, advantageously, the user 80 who requires a copy 66 of a key 5, which has been previously acquired and stored in said remote unit 24 during said first step, can avoid physically and necessarily going to the chosen duplication center 58 since the user himself can simply communicate to said duplication center the operating instructions 40 provided in the data structure 42 and/or authorize him to directly access the remote unit 24 to download the above instructions into the third device 50, he can remotely pay according to traditional methods and indicate a delivery address where you can receive the copy key 66.

Conveniently, it is understood that, once the key has been identified, the corresponding data structure 42 can be requested and downloaded from the remote unit 24 directly from the third device 50 of the duplication center 58, without intermediation of the second device 10 of the user 80.

Conveniently, in a further embodiment, the data structure 42 that the third device 50 downloads, directly or through the second device 10, from the remote unit 24 may contain the specific characteristic parameters 3' of the key 5 to be used to interrogate, by means of the module 38, the database 36—which can be loaded in the third device 50 or in the remote unit 24—so as to extract the corresponding specific operating instructions 40 to be used for controlling the duplicating machine 60.

Suitably, in the method according to the invention, the initiation of one or more of the following operations:

the download from the remote unit 24 of the operating instructions 40 to be used to obtain a copy key of a key 5 which has already been acquired, and/or the loading on a duplicating machine 60 of said operating instructions 40 to be used to obtain a copy key of a key 5 of which the acquisition has already been performed, and/or the use by a duplicating machine 60 of the operating instructions 40 to be used to obtain a copy key of a key 5 of which the acquisition has already been performed is subject to a control/authorization procedure, as described above, carried out between the third software module of the third device 50, the second software module of the second device 10 and the software of the remote unit 24.

Advantageously, as described above, the start of the processing step by the duplicating machine 60 is subject to a further control (check) of the authorization of said duplicating machine 60.

Appropriately, it is understood that the two steps, that of acquisition and that of duplication, can be carried out in two distinct moments, moments that could also be particularly distant from each other from a temporal point of view.

It is understood that the same center can act both as an acquisition center 9 and as a duplication center 58 and, opportunely, in this case, the first device 8 and the third device 50 can substantially coincide.

It is understood that the acquisition center 9 and/or the duplication center 58 can be provided in the form of:

a fully automated kiosk, and/or a semi-automatic kiosk with which the end user 80 interacts with; in particular, the detection means 4 and/or the duplicating machine 60 are managed by the final user 80 which is guided step by step, and/or a traditional specialized shop (shop) that is managed by at least one operator; in particular, the detection means 4 and the duplicating machine 60 are managed and controlled by a specialized operator and not by the user 80.

Conveniently, the use by the user 80 of the method and the infrastructure 2 can be subordinated to a correct authentication by the user himself, for example through an introductory screen displayed on his device 10 in which the user himself is required to carry out an appropriate traditional authentication step, for example by entering a password.

The solution according to the invention is particularly advantageous because:

once a certain key is acquired, a copy of this key can be obtained even without having the original key available, allows obtaining a copy key without ever physically visiting the duplication center or, at most, going to the latter only to collect the already prepared copy key, is simple and intuitive to use because most of the steps are done automatically, uses means that are already widely disseminated on the market and at an affordable cost, is simple and easy to implement, is particularly secure as it ensures that when the key features are acquired, the owner/manager of the key is physically present at the acquisition center, informs the user about which duplication center is able to duplicate a certain key and/or which is more convenient for him/her and which is operating in a certain time window and/or which has the most convenient price.

In particular, the solution according to the invention differs from those provided for in US2016/0004892, US2014/229317, WO2017/024043, WO2006/032354 and EP1339024 since none of these provides in combination:

that the loading of the operating instructions 40 (which are provided for obtaining a particular copy key 66) on an associated device/incorporated in a duplicating machine 60 and/or the use by a duplicating machine 60 of said operating instructions 40 are subject to prior authorization, and that, after the duplicating machine 60 has finished using the operating instructions 40 to obtain a copy key 66, these operating instructions are removed/deleted, preferably automatically, by the associated device/incorporated in the duplicating machine 60.

This is particularly advantageous as it ensures a high security of the data (and in particular of the operating instructions) necessary to obtain the copy key, thus avoiding that said data can be used or even reused so that it has not been authorized by a legitimate holder o manager of the key to be duplicated or another subject connected to the latter.

The central unit 24 may be implemented according to various types of digital computers, such as laptops, desktops, workstations, computers (PDA), servers, blade servers, mainframe computers and other appropriate computers.

The devices 8, 10 and 50 may be implemented by means of desktop computers, portable computers, personal digital assistants (PDAs), smartphones, tablets, laptops, netbooks, ultra-mobile personal computers (UMPC), carputers and other similar devices.

The components, their connections and relationships, as well as their functions are described hereinafter by way of non-limiting example only.

The central unit 24 comprises a processor, a memory, a storage device, a high-speed interface connected to the memory and to the high-speed expansion ports and a low-speed interface connected to the bus at low speed and to the storage device. Each of the aforesaid components is interconnected using various buses and can be mounted on a common motherboard or in other appropriate manner. The processor can process instructions in order to run them in the central unit 24 comprising the instructions stored in the memory or on storage device, or in order to display graphic information adapted for a graphic user interface (GUI) on an external input/output device, e.g. a display coupled to the high-speed interface. In other implementations, several processors and/or multiple buses can be used, according to the different memories and memory types. They can also be connected to multiple computers, wherein each computer provides part of the necessary operations (e.g. a server bank, a server blade unit or a multiprocessor system).

The memory stores the information inside the central unit 24. In one implementation, the memory comprises one or more volatile or non-volatile storage units. The memory may comprise another form of storage device, such as a magnetic or optical disk.

The storage device 27 can provide a mass memory for the central unit 24. In an implementation, the storage device may be or contain computer-readable means, e.g. a diskette device, a hard disk device, an optical disk device, a tape device, a flash memory or another similar solid-state memory device or a series of devices, including devices in a Storage Area Network (SAN) or in other configurations.

The second software module may be tangibly incorporated in a storage device. The storage device may be a non-computerized or computer-readable medium, such as the memory, the storage device or the processor memory.

The high-speed interface manages to the central unit 24 operations at high band intensity, while the low-speed interface manages operations at a low intensity of the band. This allocation of functions is by way of example only. In one implementation, the high-speed interface is coupled to the memory, to the display (e.g. through a graphic processor or accelerator) and to the high-speed expansion ports which can accept various expansion cards (not shown). In the implementation, the low-speed regulator is coupled to the storage device and to the low-speed expansion port. The low-speed expansion port, which may comprise various communication ports (e.g. USB, Bluetooth, Ethernet, wireless) may be coupled to one or more input/output devices, e.g. a keyboard, a pointer device, a scanner or a network device, such as a switch or router, e.g. via a network adapter.

The central unit 24 may be implemented in a plurality of different forms. For example, it may be implemented as a standard server or in groups of such servers. It can also be implemented as part of a rack server system or in a personal computer, possibly portable. Alternatively, the components of the central unit 24 may be combined with other components in a mobile device. Each of such components may contain one or more computers and, therefore, the central unit 24 may consist of multiple computers which communicate with one another.

The devices 8, 10 and 50 comprises a processor, memory, input/output means such as a display, a communication interface and a transceiver. Each device can also be provided with a storage medium, such as a microdrive or another medium, to provide additional storage space. Each of these components is interconnected using various buses and can be mounted on a common motherboard or in other manners, as appropriate. The processor can run instructions inside the device, including instructions stored in the memory. The processor may be implemented as a set of integrated circuits (chipset) which comprise separate and multiple analog and digital processors. The processor may include, for example, the coordination of other components of the device, such as the control of user interfaces, the applications managed by the device and the wireless communication from the device. The processor may communicate with a user via the control interface and the display interface coupled to a display. The display can be, for example, a TFT display (Thin-Film-Transistor Liquid Crystal Display) or a display OLED (Organic Light Emitting Diode) or another appropriate display technology. The display interface may comprise appropriate circuits for controlling the display to present graphic information and other information to a user. The control interface may receive controls from a user and convert them to be subjected to the processor. Furthermore, an external interface may be provided in communication with the processor, so as to allow near communication of the device with other devices. The external interface may provide, for example, wired communication in some implementations or wireless communication in other implementations and multiple interfaces may also be used. The memory stores the information inside the device 4 or 6. The memory can be implemented as one means or more computer-readable media, a storage unit or multiple volatile units or one unit or more non-volatile storage units. The expansion memory may also be provided and connected to the device through the expansion interface, which may include, for example, a SIMM card (Single In-line Memory Module) interface. Such memory expansion can provide additional space to store for the devices 8, 10 and 50 or may also store applications or other information for the device itself. In particular, the memory expansion may include instructions to perform or complete processes described above and may also include secure information. So, for example, the expansion memory may be provided as a form of security for the device and may be programmed with the instructions which allow the safe use of the device itself. Furthermore, via SIMM cards, security applications and additional information may be provided, such as the insertion of SIMM card identifying information in manner to prevent hacking. The memory may include, for example, the flash memory and/or NVRAM, as discussed below.

In one implementation, the first software module is tangibly incorporated in a storage device, which includes computer- or machine-readable means, such as the internal memory, the expansion memory, the processor memory or a propagated signal which may be received, for example, by the transceiver or by the external interface.

The devices 8, 10 and 50 can communicate wirelessly via the communication interface, which may include the digital signal processing circuits, if necessary. The communication interface can provide, among other, communications in various modes or protocols, such as voice calls GSM, SMS, EMS or MMS, CDMA, TDMA, PDC, WCDMA, CDMA2000 or GPRS. Such communication can occur, for example, by means of the radio-frequency transceiver. Furthermore, a short-range communication may occur, e.g. with the use of a Bluetooth, W-Fi or other similar transceivers (not shown). The module GPS (Global Positioning System) receiver may provide additional wireless data relating to navigation or the location of the device which can be used conveniently by applications which run or can run on the device itself.

The device 8, 10 and 50 can also communicate from the audio point of view using codec audio which can receive verbal information from a user and convert it into usable digital information. The codec audio may also generate an audible sound to a user, e.g. through a speaker, e.g. in a receiver of the client. Such sound may include a sound from voice calls, may include recorded sounds (e.g. voice messages, music files, etc.) and may also include the sounds generated by applications which operate on the device.

The system and method described hereto may be implemented using different digital electronic circuits, integrated circuits, ASIC (i.e. Application Specific Integrated Circuit) hardware, firmware, software and/or combinations thereof. These different implementations may include the implementation in one or more computer programs, which can run and/or interpreted on a programmable system, which comprises at least one programmable processor, which can be dedicated or general, connected to receive data and instructions and to transmit data and instructions on a storage system, and provided with at least one input device and at least one output device.

These computer programs (also named software, software applications or code) include machine instructions for a programmable processor and may be implemented in a high-level procedural and/or object-oriented programming language and/or in assembly language or machine language.

The expressions "machine-readable means" and "computer-readable means" herein mean any product, apparatus and/or medium for computers (e.g. magnetic disks, optical disks, memory, programmable logic devices) used to provide machine instructions and/or data to a programmable processor, including a means which is readable by a machine and which receives machine instructions in form of a signal readable by the machine itself. The word "machine-readable signal" refers to any signal used to provide instructions and/or machine data to a programmable processor.

In order to interact with the user, the devices described hereto may be provided with a display (e.g. a cathode ray tube) or an LCD (liquid crystal display) for displaying information to the user and a keyboard and pointer (e.g. a mouse or trackball) with which the user can provide information to the device itself. Other types of means can be used to interact with the user; for example, the feedback to the user can be in any form of sensory feedback (e.g. graphic feedback, auditory feedback or tactile feedback) and user input can be received in any form including acoustic, vocal or tactile input.

The infrastructure may also comprise any computerized system which comprises a back-end component (e.g. a data server) or a middleware component (e.g. an application server) or a front-end component (e.g. a client computer, equipped with a graphic user interface or a Web browser through which a user can interact) or any combination of such back-end, middleware or front-end components. The infrastructure components can be interconnected with any digital data communication form or means (e.g. a communication network). Examples of communication networks include Local Area Network ("LAN"), Wide Area Network ("WAN") and the Internet.

Preferably, in the infrastructure 2 according to the invention the devices 8, 10 and 50 act as clients, while the central unit 24 acts as a server. Conveniently, the clients and server are generally mutually distant and generally interact via a communication network and, preferably, interact always and only through the Internet. The relationship between client and server is implemented by means appropriate computer programs running on the respective processors and which have mutual client-server relationships.

The invention claimed is:

1. A method of obtaining a copy key of a key, comprising:
acquiring characteristic parameters of the key using a detection system;
identifying operating instructions to reproduce the characteristic parameters thus acquired;
to obtain the copy key of the key on which the characteristic parameters have been obtained, requiring authorization to load into a duplicating machine and/or to use in a duplicating machine the operating instructions to create the copy key;
only if the authorization is given, loading the operating instructions into the duplicating machine and/or making the operating instructions available for use by the duplicating machine;
controlling the duplicating machine of at least one duplicating center according to the operating instructions previously loaded and/or made available, to obtain the copy key; and
as soon as the copy key is obtained, automatically removing the operating instructions from the duplicating machine,
wherein, as soon as the loading in the duplicating machine of the operating instructions has been authorized:
display identification data of a type of raw key to start from on a display associated with, or incorporated into, the duplicating machine, and
having the duplicating machine use data related to the operating instructions to be supplied to the duplicating machine to obtain a specific encryption without being displayed, or only partially and not completely displayed, on the display.

2. The method according to claim 1, wherein, for obtaining the copy key of the key for which the step of acquiring has already been carried out, the authorization is required for:
downloading from a remote unit the operating instructions to be used to obtain the copy key;
directly loading the operating instructions into a device associated with or provided in the duplicating machine; and
only if the authorization is granted, downloading the operating instructions as to load the operating instructions in the duplicating machine.

3. The method according to claim 2, wherein the operating instructions comprise at least one of the following data:
identification data of the type of raw key to start from,
data related to the duplicating machine to be used to obtain a specific type of encryption,
data identifying a cutter to be used for encryption,
data identifying a type of clamps or jaws to be used to lock the raw key during milling,
data related to the operating instructions to be supplied to a specific duplicating machine to obtain the specific type of encryption.

4. The method according to claim 3, wherein the remote unit is interrogated to identify at least one duplication center which is provided with the duplicating machine configured to implement the operating instructions associated with the key for which the copy key is to be obtained.

5. The method according to claim 1, wherein, before, during, or at an end of a processing step in which the duplicating machine is controlled based on the operating instructions previously loaded to obtain the copy key, a check is carried out of the authorization of the duplicating machine to start, carry out, or continue the processing step.

6. An infrastructure to obtain a copy key of a key, comprising:
a first device associated or provided with a detection system of characteristic parameters of the key;
a remote unit in which, in an organized manner, for each key acquired by the detection system, the characteristic parameters identified by the detection system or corresponding operating instructions necessary for obtaining the characteristic parameters are memorized;
a second device configured to manage, check, or control a start of a step, in which the copy key is to be obtained, the second device being portable and managed by a user, who is an owner or a manager of the key to be acquired in the remote unit or by the user who wants to obtain the copy key of the key already acquired in the remote unit;

a third device, which communicates with the second device and/or with the remote unit, the third device being configured to receive the operating instructions of the key, of which the copy key is to be obtained, the third device being located at a duplication center and being managed by the duplication center;

a key duplicating machine, which is provided with or associated with the third device, to create the copy key based on the operating instructions received by the third device; and a first software module configured to:

authorize the third device to receive and use the operating instructions to create the copy key, and removing or deleting automatically from the third device, as soon as the copy key has been obtained from the duplicating machine, the operating instructions previously received from the third device and used by the duplicating machine to create the copy key, wherein:

the first software module configured to authorize the third device to receive and use the operating instructions comprises a software loaded and executed in the remote unit, a second software module is loaded and executed in the second device, and a third software module is loaded and executed in the third device, the first, the second, and the third software module being configured to interact so as to implement a procedure for authorizing the third device to download and to use the operating instructions for obtaining the copy key of the key that has already been acquired, and the third software module of the third device is configured to never visualize entirely on a display of the third device and/or of duplicating machine data related to the operating instructions to be supplied to the duplicating machine to obtain a particular encryption.

7. The infrastructure according to claim 6, wherein the third device comprises a control device of the duplicating machine, is incorporated in the duplicating machine, or is external and distinct from the duplicating machine, and is connected to a control processor of the duplicating machine.

8. The infrastructure according to claim 6, wherein the second device (10) is configured to receive the characteristic parameters and/or the operating instructions from the remote unit and send the characteristic parameters and/or the operating instructions to the third device.

9. The infrastructure according to claim 6, wherein the first software module is loaded and executed in the first device and the second software module is loaded and executed in the second device, the first and second software modules being configured to interact with each other and with the software loaded and executed in the remote unit so as to implement an authorization procedure to be able to proceed with an acquisition of the characteristic parameters of the key by the detection system.

10. The infrastructure according to claim 9, wherein the software loaded and executed in the remote unit, the second software module loaded and executed in the second device, and the first software module loaded and executed in the first device are configured to perform the following operations:

the second software module loaded and executed in the second device, sending a request to the remote unit, upon the request, having the software in the remote unit generate an authorization code and send the authorization code to the second software module of the second device, having the first software module of the first device receive the authorization code that was sent to the second software module of the second device, after receiving the authorization code, having the first software module of the first device send the authorization code to the software in the remote unit, having the software in the remote unit check whether the authorization code received from the first device corresponds to the authorization code previously generated and sent to the second device and, if the check is successful, generate a first request signal and send the first request signal to the second software module of the second device, having the second software module of the second device receive the first request signal and request the user, through a graphical interface of the second device, to command sending to the first device a command signal to start the acquisition step, having the first software module of the first device receive the command signal and starts the acquisition of the characteristic parameters of the key by the detection system, wherein:

the second software module of the second device receives from the remote unit the authorization code and displays the authorization code on the display of the second device, and the first software module of the first device is configured to receive the authorization code upon entering the authorization code on a user interface of the first device.

11. The infrastructure according to claim 10, wherein the software module configured to automatically remove from the third device the operating instructions comprises the third software module, which is loaded and executed in the third device.

12. The infrastructure according to claim 11, wherein the software loaded and executed in the remote unit, the third software module, and the second software module, are configured to interact in order to authorize and control a download from the remote unit of the operating instructions to be used to obtain the copy key of the key that has already been acquired.

13. The infrastructure according to claim 10, wherein the software loaded and executed in the remote unit, the third software module, which is loaded and executed in the third device, and the second software module, which is loaded and executed in the second device, are configured to perform the following operations:

the second software module loaded and executed in the second device sends a request to the remote unit;

upon the request, the software in the remote unit generates an authorization code and sends the authorization code to the second software module in the second device;

the third software module in the third device receives the authorization code that was sent to the second software module of the second device;

after receiving the authorization code, the third software module in the third device sends the authorization code to the software in the remote unit;

the software in the remote unit performs a check of whether the authorization code received from the third device corresponds to the authorization code that previously generated and sent to the second device, and, if the check is successful, generates a first request signal and sends the first request signal to the second software module in the second device; and the second software module in the second device receives the first request signal and requests the user, via a graphical interface of the second device, to send a command signal to the remote unit to authorize a download of the operating instructions by the third device or a loading of the operating instructions into the duplicating machine, or to authorize the duplicating machine to use the operating instructions.

14. The infrastructure according to claim 13, wherein, after the request by the second device to authorize the download of the operating instructions by the third device, to load the operating instructions into the duplicating machine, or to authorize the duplicating machine to use the operating instructions, the software in the remote unit is configured to generate the authorization code and associate a time interval for a validity of the authorization code so that, after the time interval, the authorization code is no longer valid or can no longer be verified.

15. The infrastructure according to claim 14, wherein:
the second software module receives the authorization code and displays the authorization code on the display of the second device, and
the third software module in the third device is configured to receive the authorization code upon entering the authorization code on a user interface of the third device.

16. The infrastructure according to claim 14, wherein:
the third software module in the third device is configured to automatically delete from its internal memory, as soon as the duplicating machine has used the operating instructions to perform a processing adapted to obtain the copy key, the operating instructions downloaded and used to obtain on the copy key and an encryption corresponding to the particular encryption of the key to be duplicated, or
the third software module of the third device is configured to automatically delete from an internal memory the data downloaded and related to the operating instructions to be supplied to the duplicating machine to obtain the particular encryption, only after a number of machining operations has been carried out in sequence that correspond to a number of copy keys to be obtained.

17. The infrastructure according to claim 14, wherein the third software module of the third device and the software loaded and executed in the remote unit are configured to interact so as to implement a verification procedure of the authorization of the duplicating machine to carry out, start, or continue a processing for obtaining the copy key.

18. The infrastructure according to claim 6, further comprising a software module adapted to correct and optimize the characteristic parameters of the key (acquired by the detection system.

19. The infrastructure according to claim 6, wherein the second device communicates by way of a first short-range communication system with the first device, which is associated or provided with the detection system of the characteristic parameters of the key.

20. The infrastructure according to claim 6, further comprising a database, in which a location of all duplicating machines belonging to the infrastructure is univocally identified, the location being associated or matched with corresponding operating instructions, which are adapted to be implemented in the location.

* * * * *